D. J. DEEN.
DUMPING-BOX FOR WAGONS.

No. 177,324.          Patented May 16, 1876.

Witnesses
P. A. Renwick
Frederic W. Paine

Inventor.
David J. Deen
By Taggart Simonds & Fletcher
Attys.

UNITED STATES PATENT OFFICE.

DAVID J. DEEN, OF GRAND RAPIDS, MICHIGAN.

IMPROVEMENT IN DUMPING-BOXES FOR WAGONS.

Specification forming part of Letters Patent No. 177,324, dated May 16, 1876; application filed March 15, 1876.

*To all whom it may concern:*

Be it known that I, DAVID J. DEEN, of the city of Grand Rapids, county of Kent and State of Michigan, have invented a new and Improved Dumping-Box, designed for use in hauling and dumping earth, gravel, &c., of which the following is a specification:

The object of my invention is to construct a substantial and convenient dumping-box, supported or hung upon a single beam or support, either end of such beam being supported by the axle-tree of a wagon, substantially as shown in—

Figure 1:
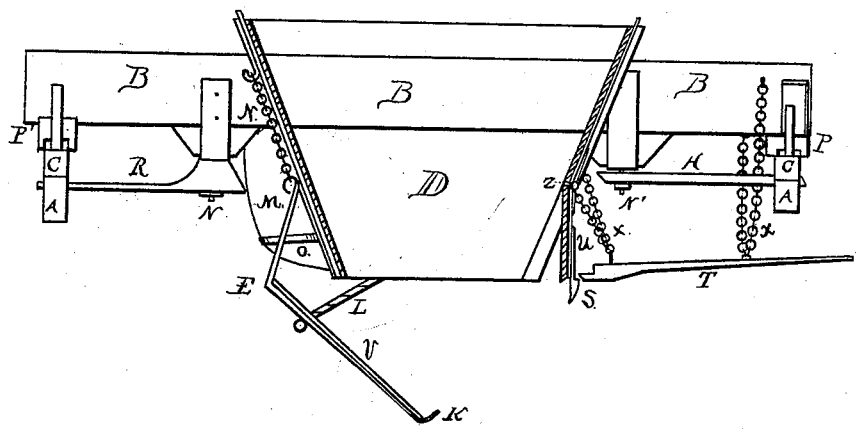
Figure 2:
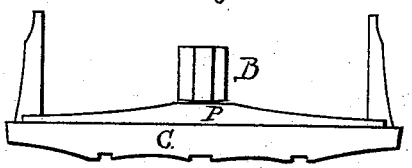

Figure 1 of accompanying drawings, which Fig. 1 is a sectional view of my invention, as it appears resting upon the bolsters of a wagon. Fig. 2 shows an end view of one of the bolsters, with the end view of the supporting bar or beam.

In Fig. 1, D represents the dumping-box, supported by the beam B B B, as shown. The beam B B B rests or is supported at either end upon bolsters P and P', which are placed upon the bolsters C C. The bolsters C C are similar in construction to those of an ordinary wagon, and the dumping-box, with the beam B B B, may readily be applied to an ordinary wagon by simply removing the reach, the bar B B B and short reach R supplying the place of the wagon-reach. A A are the axle-trees. R is a short reach passing through the bolster C in the ordinary manner, and which bolster, with the hounds, operates in every respect the same as in ordinary wagons. The short reach R is attached to the beam B B B in the manner shown in the drawings, or in any suitable and substantial manner.

H is the hounds of the back axle-tree, attached to the beam B B B in the manner shown in Fig. 1.

The box is narrower at the bottom, and is provided with the trap V, which is provided with two bent bars, bent at such an angle that the upper part of each fits the side of the box when the bottom trap is closed. One of these bars, E, is shown in the drawing. The bent bars are attached by chains (one for each bar) to the box, as shown, which bars and chains form a sort of hinge for the trap V. A rope or cord is attached to either side of the trap, and passes around the back part of the box so that the trap V may be readily closed by a person standing behind the wagon. The trap V is provided with an iron loop, K, so arranged as to engage with the catch or spring S when the trap V is closed. U is a trap hinged to the box at Z, and when open falls into the position shown in the drawings, and when shut is on a line with the side of the box, to which it is hinged. When it is desired to close the box the trap U is pushed forward by means of the lever T, and the trap V drawn up quickly by means of the rope L, and the catch or spring S will engage with loop K and hold both V and U in position.

The advantage of using the bent bars E and chains to form a hinge consists in the fact that the trap V, when loosened, is drawn from beneath the box, allowing the earth to pass out of the box. This is also facilitated by using the additional trap U. The trap U, opening as it does from the back side of the dump-box, allows free forward motion to the device without dragging or scraping along the pile of dirt. Another advantage claimed for the hinge and arrangement of trap V is that in case the team after the dumping of the dirt should accidentally or for other reason back up, the trap will be lifted out of the way, and cause no trouble or inconvenience.

The lever T may be suspended by the chains X X, or in any other suitable manner. O is a metallic guide, held in place by means of the projection M. A similar guide is used on the other side of the box, and together they are used to guide or direct the bent bars E, and thereby the trap V to the proper place, when drawn back by means of the rope, as above described.

Having thus described my invention, what I claim to have invented, and desire to secure by Letters Patent, is—

1. The dumping-box D, supported by and in combination with the single longitudinal beam B B B, which beam is supported at either end by the axle-tree of the wagon, and forms, as it were, the wagon-reach, when constructed substantially as and for the purpose described.

2. The combination-chain N, bent bar E, and lower trap V, for the purposes described.

3. The combination, the trap V provided with loop K, with the trap U, provided with the spring S, so as to work or act simultaneously in dumping the load, substantially as described.

4. The combination of the box D, beam B B B, provided with short reach R, and the bolsters of a wagon P and P', substantially as and for the purposes described.

DAVID J. DEEN.

Witnesses:
FREDERIC W. PAINE.
EDWARD TAGGART.